2,857,284

MEAT TENDERIZING COMPOSITION AND METHOD OF MAKING

Floyd Ralph York, Boulder, Colo.

No Drawing. Application November 19, 1956
Serial No. 622,785

11 Claims. (Cl. 99—222)

My invention relates to meat tenderizing preparations, including a process of making same, and, although not limited thereto, has particular reference to such preparations as are sold in grocery stores in granular form under various trade names for sprinkling on meat prior to cooking of the same.

Meat tenderizing preparations as characterized incorporate as the tenderizing component proteolytic, or protein-splitting, enzymes such as, for instance, the enzymes of papain (Papayotin) which, as stated in the U. S. Patent to H. E. Allen, No. 2,140,781, dated December 20, 1938, are derived from the partially ripe fruit or leaves of the tropical papaw tree (*Carica papya*). Another similarly effective proteolytic enzyme, known as "macin" is obtainable from the Osage orange tree (*Maclura pomifera*) as set forth in the Patent No. 2,240,518, issued on May 6, 1941, to James M. Ramsbottom. The proteolytic enzyme "macin," as the patentee Ramsbottom explains, is a precipitate produced in the usual way from an extract which is obtained by pressing juice from the fruit or from the fresh leaves, stems, and roots of said tree.

One of the primary difficulties with meat tenderizing preparations containing proteolytic enzymes as characterized has been that the effective strength of said enzymes, and flavoring components when used, diminishes quite rapidly as the result of exposure to the atmosphere after the package has been opened. This is especially true because the container most commonly used has an apertured shaker form top. Another difficulty with such preparations is the maintenance of a uniform distribution of the enzymes throughout the product.

Therefore, primary objects of the present invention are to overcome the difficulties aforenoted and to provide a granular meat tenderizing product containing proteolytic enzymes wherein the protein-splitting strength of the latter will be uniformly distributed and will be long lasting, so that the preparation will be effective for meat tenderizing purposes even though a long time elapses between opening and initial use of the package and the time when the contents are exhausted.

Additionally, the invention contemplates a novel product of the character specified and a process of preparing the same whereby the proteolytic enzymes and flavoring components, when used, are physically incorporated in the individual grains of sodium chloride in crystal form, the same being hereinafter referred to in the specification and claims as crystal salt, whereby the effective strength of such enzymes, etc., will be maintained over long periods of time and uniform distribution of said enzymes, etc., in a diluent made possible.

Other objects and advantages of the invention will be understood and appreciated by those versed in the art as the description proceeds.

In common with prior granular meat tenderizing compositions for sprinkling on meat prior to the cooking, the proteolytic or protein-splitting enzymes of the present invention are mixed with a suitable diluent, or diluents, such for example as common salt, sucrose or dextrose, the latter to neutralize the taste of the salt.

Although as earlier indicated herein the proteolytic enzymes employed in my preparation may be papain, macin or a similarly acting substance, I prefer to use papain because it is readily available commercially. Since liquid papain has an objectionable taste, I prefer to use a commercial equivalent thereof known as "Essence of Caroid" which is available in the open market and particularly in most drug stores. The papain component of this preparation is known commercially under the trade name "Caroid" and comprises the protein-splitting components of propain with inert components largely eliminated to make the product more palatable. This propain-containing, so-called "Essence of Caroid" preparation is an aqueous-glycerine-alcohol solution with an alcohol content of ten percent, and containing one and one half (1½) grains of concentrated protein-splitting papain components ("Caroid") per gram. Although the protein-splitting strength of liquid propain will vary somewhat, it will average the protein-splitting strength of "Essence of Caroid." The two are therefore equivalents.

The aforementioned papain-containing aqueous-glycerine-alcohol solution (so-called "Essence of Caroid") is very stable and is made so by the glycerine and alcohol components. In other words, the user can depend upon each dram or other measure of the solution containing a uniform amount of the protein-splitting papain components, which is not so with liquid propain.

When "macin" or a similarly acting material is used as the proteolytic or protein-splitting enzyme in the preparation of my product, it is to be understood that it may be used in its usual liquid form or a protein-splitting essence thereof will be combined with a suitable liquid vehicle. This vehicle may be an aqueous-glycerine-alcohol solution, or the equivalent, and in about the concentration heretofore noted, namely, one and one half (1½) grains of macin protein-splitting essence per dram of solution; and it will be considered the equivalent of "liquid macin," or liquid papain.

Furthermore, I incorporate in my product a substance or substances to prevent caking of the preparation, not only during a stage of the manufacturing process (as will be hereinafter explained) but also after preparation of the product has been completed. Substances suitable for this purpose are magnesium carbonate and corn starch. As a matter of preference, I use both magnesium carbonate and corn starch, the latter because it supplies bulk and therefore functions as a diluent along with the salt and sugar and the former for its more concentrated drying and anti-caking effect on the product.

The use of flavoring components, and especially concentrated beef extract, in my preparation is deemed to be particularly desirable even when the protein-splitting papain component, for instance, is supplied by the "Essence of Caroid" preparation mentioned wherein the objectionable papain taste is largely eliminated. The reason the use of concentrated beef extract is desirable is that, in many parts of this and other countries beef generally, and steaks particularly, are usually frozen for varying lengths of time and freezing substantially diminishes or weakens the natural flavor of the meat. This flavor can, to a very considerable extent, be restored by incorporation of concentrated beef extract in a tenderizing composition.

Various other flavoring components such as garlic, black pepper, paprika, charcoal, etc., can be incorporated in the preparation if desired, and have heretofore been used in meat tenderizing preparations of the class to which my invention relates. No novelty is claimed hereing for the use of such flavoring components per se; except beef extract; but novelty is claimed for my novel product wherein flavoring components and/or the proteolytic or protein-splitting enzymes are physically incorporated in and encased by the individual grains of crystal salt as a carrier or vehicle, as will be hereinafter explained in connection with my novel method or process of manufacture of the product.

A preferred formula for my product, the quantities of the ingredients being given by weight, is as follows:

GROUP (1)

(a) Flavoring components:

| | |
|---|---|
| Garlic | 4½ ozs. |
| Black pepper | 6¾ ozs. |
| Paprika | 1 lb. 10 ozs. |
| Kitchen Bouquet (a meat essence containing liquid) | 2 lbs. 7 ozs. |
| B. V. extract (a concentrated liquid meat essence extract | 3 lbs. 12 ozs. |

(b) Protein-splitting component liquid

| | |
|---|---|
| papain (or equivalent) | 3 lbs. 12 ozs. |

(c) Carrier for (a) and (b), supra,

| | |
|---|---|
| crystal salt | 4 lbs. 8 ozs. |

GROUP (2)

(Diluents):

| | |
|---|---|
| Common salt | 64 lbs. |
| Powdered sugar | 19 lbs. 8 ozs. |
| Corn starch | 4 lbs. 14 ozs. |
| Magnesium carbonate | 9 ozs. |

FINAL INGREDIENT (3)

| | |
|---|---|
| Corn starch | 2 lbs. 7 ozs. |

Having reference to the above formula, the ingredients comprising Groups (1) and (2) are mixed separately in mechanical mixers, the former group as a wet liquid, or semi-liquid mix and the latter group as a dry mix until a thorough mixing of the ingredients has been accomplished. This means that the blended liquid components of Group (1) will be largely absorbed by the crystal salt but that in any event the papain especially when in the form of "Essence of Caroid" will be practically entirely absorbed by said salt because it is a lighted liquid than the others.

Now the Group (1) and (2) mixtures are combined and mixed in a mechanical mixer until a thorough mixture of the components has been accomplished.

Then the product of the Group (1) and (2) mixture is spread very thin on a flat surface and dried very slowly, preferably in the presence of heat at a temperature of say 100° F. or thereabouts so as to simply drive off moisture without cooking the product. In the drying step the crystal salt of Group (1) retains the solid protein-splitting components of the absorbed liquid papain and flavoring ingredients and constitutes a preserving carrier therefor so that the effectiveness and strength of the product will be preserved for a long period of time despite exposure to the atmosphere.

After the dried product of the Group (1) and (2) mix has been dried thoroughly, the final ingredient (3) namely, the second charge of corn starch is added and the product is ground very fine in a suitable grinder so that it can be shaken like salt. The product is now ready for packaging.

It is to be understood that the flavoring components mentioned as (a) in Group (1) can be dispensed with if desired because there are many people who prefer to use catchup or other sauces of their choice on their meat. However, the use of Kitchen Bouquet, B. V. extract, or some concentrated liquid meat essence extract as a flavoring component is novel and is desirable as noted earlier herein, because so much of the meat on the market today has been frozen and thus deprived, to a considerable extent, of its natural taste and full flavor.

Obviously the amount of crystal salt used can be varied within wide limits. The essential function of the crystal salt is to absorb and encase all or a substantial portion of both the enzyme and the blend of the flavoring components when used. Of course, more crystal salt may be used than is sufficient to accomplish this end; and good results will still be obtainable if the quantity of crystal salt is sufficient to absorb substantially less than all of the enzyme and flavoring components.

The corn starch and magnesium carbonate of the Group (2) mix is to prevent caking during the drying step of the process; and the final addition of corn starch after the grinding step is to further guard against caking of the product in the package.

Although in the preferred formula above set forth I have specified powdered sugar, it is obvious that other varieties of sucrose or dextrose may be used. The stated quantities of the diluent and/or anti-caking ingredients comprising Group (2) such as common salt, sugar, corn starch, magnesium carbonate are not critical. However, a ratio of say three parts of common salt to one part of sugar is desirable because it largely eliminates a salt taste in the preparation and thus enables it to be applied freely to the meat when desired. Also, as stated, the flavoring components listed as (a) in Group (1) can be eliminated.

Thus, a further formula for a product incorporating my invention and using concentrated meat extract is stated as follows, the percentages given being by weight.

GROUP (1A)

| | Percent |
|---|---|
| Liquid papain (or the equivalent) | 3–10 |
| Concentrated meat extract (commercially known as B. V. extract) | 2–4 |
| Crystal salt | 5–14 |

GROUP (2A)

| | |
|---|---|
| Common salt and sugar (from 2 to 4 parts salt to 1 part sugar) | The remainder. |

The Group (1A) and (2A) ingredients to be mixed separately; then combined and dried as previously described and subsequently ground fine. The addition of anti-caking components such as magnesium carbonate and/or corn starch to be optional prior to the drying step, thereafter or both.

Still a further formula for a product incorporating my invention in its broadest aspects, a subcombination so as to speak, of the aforenoted formulae, would be a concentrate of the tenderizing component in crystal salt as a carrier for, for instance, subsequent incorporation in either water or another suitable diluent; or in a dry material diluent such as is set forth in Group (2) or Group (2A). The formula for the product last mentioned, weight being the unit of measure, is as follows:

*Third formula*

| | Percent |
|---|---|
| Liquid papain (or the equivalent) | 10–70 |
| Crystal salt | 30–90 |

The two products to be wet mixed, subsequently dried as before but with grinding of the dried enzyme-carrying crystals optional.

Still another formula for a product embodying my invention is stated as follows:

*Fourth formula*

| | |
|---|---|
| The product of the third formula (supra) percent | 5–15 |
| Common salt and sugar (from two to four parts of salt to one part of sugar) | The remainder. |

The ingredients aforementioned to be ground fine and mixed in a mechanical mixer. Addition of anti-caking components such as magnesium carbonate and/or corn starch prior to the mixing or grinding step being optional.

Having thus described my invention, what I claim is:

1. A dry granular meat tenderizing composition comprising a first mixture consisting of a liquid proteolytic protein-splitting enzyme within the range of 3 to 10% by weight, concentrated liquid meat extract within the range of 2 to 4% by weight, the enzyme and extract physically absorbed in the individual grains of crystal form sodium chloride of a quantity within the range of 5 to 14% by weight, and a second mixture as the remainder of the composition and comprising from two to four parts by weight of common salt to one part by weight of a sweetening member of the group consisting of dextrose and sucrose.

2. The composition set forth in claim 1, and said protein-splitting enzyme comprising the protein-splitting components of papain which have previously been incorporated in an aqueous glycerin-alcohol solution in the proportion of about one and one half grains of said papain components to each dram of solution, the solution having been mixed with the crystal-form sodium chloride and thereafter evaporated so as to incorporate said papain components in the grains of the sodium chloride.

3. The composition set forth in claim 1, and the protein-splitting enzyme being papain.

4. The composition set forth in claim 1, and the protein-splitting enzyme being macin.

5. In a meat tenderizing composition, a dried granular product comprising a protein-splitting enzyme physically encased in individual grains of initially crystal form sodium chloride as a carrier and preserving medium therefor, said product produced from a subsequently slowly dried wet mix of crystal form sodium chloride with an aqueous glycerine-alcohol solution containing about one and one-half grains of a protein-splitting enzyme to each dram of solution, the solution being within the range of 10 to 70% by weight of the wet mix, and the crystal form sodium chloride within the range of 30 to 90% thereof by weight.

6. In a meat tenderizing composition, a dried granular product comprising a protein-splitting enzyme physically encased in individual grains of initially crystal form sodium chloride as a carrier and preserving medium thereof, said product produced from a subsequently slowly dried wet mix of crystal form sodium chloride with an aqueous glycerine-alcohol solution containing a protein-splitting enzyme, the solution being within the range of 10 to 70% by weight of the wet mix, and the crystal form sodium chloride within the range of 30 to 90% thereof by weight.

7. The composition set forth in claim 6 and the protein-splitting enzyme comprising papain.

8. The composition set forth in claim 6, and the protein-splitting enzyme comprising macin.

9. The steps in the process of preparing a meat tenderizing composition which comprise intimately mixing crystal form sodium chloride with a liquid which is impregnated with a proteolytic-protein-splitting enzyme which is soluble therein, the quantity of said sodium chloride being at least sufficient to fully absorb the enzyme impregnated liquid, and then slowly drying said mixture to evaporate off the liquid and cause the individual grains of sodium chloride to absorb and encase a quantity of said enzyme.

10. The steps in the process of preparing a meat tenderizing composition which comprise intimately mixing sodium chloride in crystal form with a liquid which is impregnated with a proteolytic-protein-splitting enzyme and a flavoring material which are soluble therein, the quantity of sodium chloride being at least sufficient to fully absorb the enzyme and flavoring material-impregnated liquid, and then slowly drying said mixture to evaporate the liquid and cause the individual grains of sodium chloride to absorb and encase a quantity each of said enzyme and flavoring material.

11. The process of preparing a meat tenderizing composition which comprises intimately mixing sodium chloride in crystal form with a liquid which is impregnated with a proteolytic-protein-splitting enzyme and a flavoring material, both of which are soluble therein, the quantity of sodium chloride being at least sufficient to fully absorb the liquid, slowly drying said mixture to evaporate off the liquid and cause the individual grains of sodium chloride to absorb and encase a quantity of each of said enzyme and flavoring material, then mixing the enzyme impregnated sodium chloride with a diluent comprising an intimate mixture of common salt and sucrose, the quantity of sucrose in relation to the common salt being sufficient to neutralize the salt taste to at least a predetermined degree, and finally fine-grinding the product for use in a salt shaker-like container.

References Cited in the file of this patent

UNITED STATES PATENTS

| | | |
|---|---|---|
| 220,745 | Ball | Oct. 21, 1879 |
| 1,936,074 | Tressler et al. | Nov. 21, 1933 |
| 2,056,540 | Segura | Oct. 6, 1936 |
| 2,140,781 | Allen | Dec. 20, 1938 |
| 2,240,518 | Ramsbottom | May 6, 1941 |
| 2,774,673 | Young | Dec. 18, 1956 |